Nov. 27, 1956 AN WANG 2,772,357

TRIGGERING CIRCUIT

Filed June 6, 1952 4 Sheets-Sheet 1

INVENTOR.

An Wang

TRIGGERING CIRCUIT

Filed June 6, 1952 4 Sheets-Sheet 2

INVENTOR.

An Wang

TRIGGERING CIRCUIT

Filed June 6, 1952 4 Sheets-Sheet 3

INVENTOR.

An Wang

INVENTOR.
An Wang

United States Patent Office 2,772,357

Patented Nov. 27, 1956

2,772,357

TRIGGERING CIRCUIT

An Wang, Cambridge, Mass.

Application June 6, 1952, Serial No. 292,215

28 Claims. (Cl. 250—27)

This invention relates to counters and more particularly to novel triggering circuit means especially useful for automatically scaling high frequency electrical impulses.

Heretofore, scalers used for dividing a large number of electrical impulses into a smaller number of such impulses to enable the use of mechanical counting devices have employed the well known vacuum tube trigger pair. Such a pair could be used as a binary scaler to provide a single output pulse for each two input pulses because such trigger pair had two stable states of operation with either one of the two vacuum tubes in a conducting state. Thus, it had a trigger action in that, when a pulse arrived at the grid of one of the tubes of the trigger pair, the amplification of the tube and the intercoupling between the two tubes served to trigger the trigger pair from one state to the other; thus, for a binary scaler, two vacuum tubes were required.

Where it was necessary to scale in larger increments, a number of such binary scalers could be arranged in series to divide the incoming pulses by any power of two. If it was desired to operate the scaler on the decade number system rather than the binary number system it was necessary to use relatively complicated circuits employing additional elements beyond the usual trigger pairs.

I have found that the static magnetic storage and pulse transfer controlling device as described in my application for U. S. patent, Serial Number 122,769 filed October 21, 1949, Patent No. 2,708,722, granted May 17, 1955 for Pulse Transfer Controlling Devices and Methods may effectively be employed to provide novel triggering circuits particularly useful as scaler circuits.

It is an object of the present invention to provide novel triggering circuits employing magnetic pulse transfer controlling devices as well as other circuit elements in circuits far simpler and more reliable than heretofore known circuits.

It is another object of the present invention to provide a scaler which is not only very much simpler than the heretofore known trigger pair scalers but also one which uses substantially smaller steady state currents.

It is a feature of my invention that, in addition to a simplified binary scaler, as well as scalers having any one of a number of ratios, I have been able to provide a very much simpler decade scaler circuit than was heretofore contemplated.

For the purpose of more fully describing preferred embodiments of my invention, reference is made to the following drawings in which.

Figure 1:
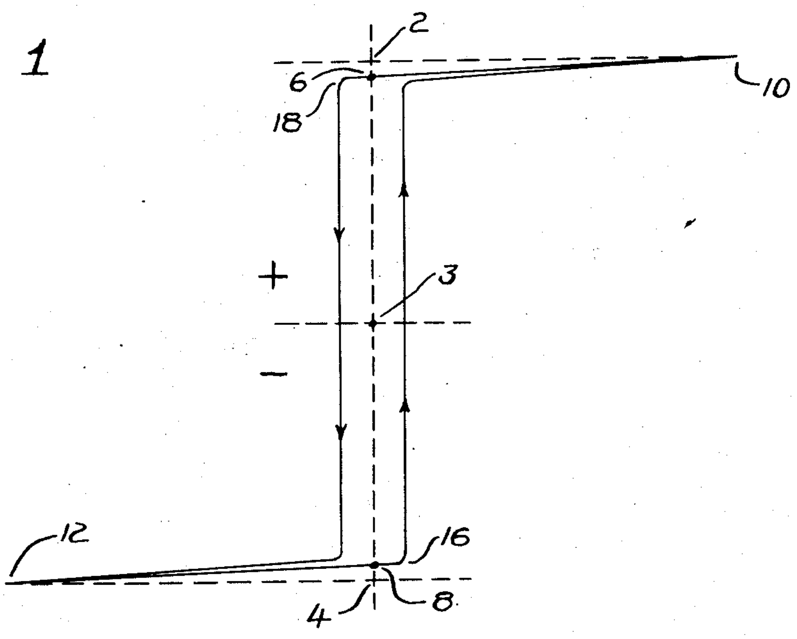
Fig. 1 is a hysteresis curve of magnetic material such as is used in my magnetic storage device.

Referring to Fig. 1, the hysteresis characteristic of the magnetic material used in my static magnetic device should be such that the residual magnetic flux density (Br), shown by the distance between the points 3 and 2, and 3 and 4, be at least 0.4–0.5, preferably greater than 0.8, and in general as large as possible. If the ratio Br/Bs, where Br is the residual magnetic flux density and Bs the saturation flux density, is too small, the operation of the static magnetic device will be unreliable and even inoperative. I prefer also that the knees 16 and 18 of the hysteresis curve be as square as possible. A magnetic material known as "Deltamax," manufactured by the Alleghany Ludlum Steel Corp., is satisfactory, such material being an especially treated nickel-iron alloy in which the ratio Br/Bs is approximately 0.9 and the hysteresis curve substantially as shown in Fig. 1.

Such a magnetic material has two states of equilibrium, the point 6 which represents residual magnetic flux density of positive polarity, and the point 8 which represents residual magnetic flux density of negative polarity. As more fully explained in my application Serial No. 122,769, the transfer of pulses from an input winding on a core of such a magnetic material to an output winding on the core may be controlled by setting the core at a state of residual magnetic flux density which will either allow or prevent transfer, or conversely, the state of the core may be sensed by applying a current pulse to a winding on said core.

Assuming, for example, the core to be at negative state of residual magnetism, if a negative pulse is applied to a winding on such core there will be little or no flux change in the core, hence, the winding will appear as a short circuit and no power will be transferred through the core. If, on the other hand, the same pulse is applied to the core at a positive state of residual magnetism, a large flux change will occur. The winding will then have a comparatively high impedance and power will be transferred through the core. If there are other windings on the core any change in flux will increase the voltage across such windings.

Figure 2:
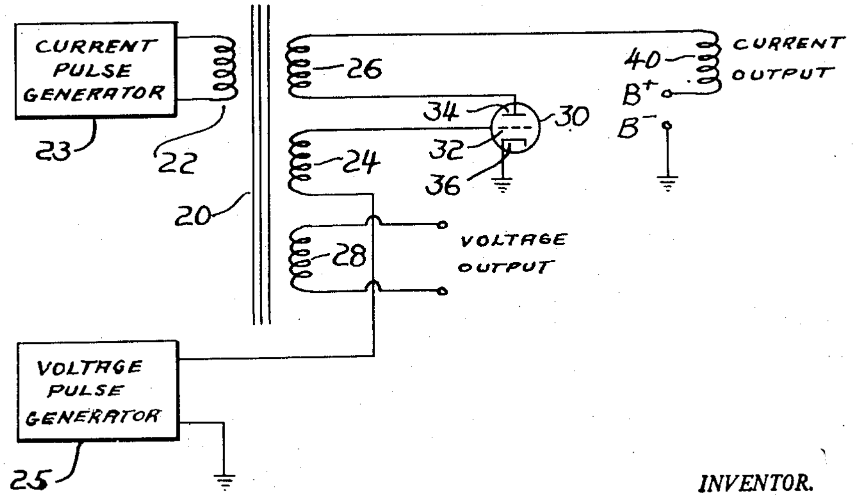
Fig. 2 is a circuit diagram of the binary scaler of my invention.

Referring to Fig. 2, my novel magnetic binary scaler includes a magnetic core 20 with winding means consisting of one or more windings which also operate as mixing means as hereinafter more fully explained, and an amplifying means such as a triode vacuum tube 30. Other suitable amplifying means, such as transistors or magnetic amplifiers, for example, could be used. The magnetic core 20 has properties as explained above. Thus, when there is no current flow through any of the windings on the core 20, the core will stay at either one of two positions depending on the previous history of the core. In essence then, the magnetic core 20 is used as a memory device for the residual count of the binary scaler, which count may be determined by sensing the polarity of the residual magnetic flux to provide a core output voltage.

For my novel binary scaler, I provide core 20 with three windings, an input current pulse winding 22, a voltage input pulse winding 24, and a reset winding 26. If it is desired to provide a voltage pulse output from the binary scaler, an additional voltage output winding 28 may be used. The input current pulse winding 22 is connected to any siutable source of current pulses such as current pulse generator 23. The input voltage pulse winding 24 is connected at one end thereof to a suitable source of voltage pulses such as voltage pulse generator 25 and at the other end to the grid 32 of triode vacuum tube 30. The reset pulse winding 26 is connected at one end to a suitable source of B+ voltage through output coil 40 and at the other end to plate 34 of triode vacuum tube 30. The cathode 36 of said tube is connected to the B− side the high voltage supply for said triode, the cathode being shown as grounded in Fig. 2.

The input pulse to be counted must be in two forms, a positive voltage pulse suitably biased for feeding to grid 32 of triode 30, and a current pulse of suitable amplitude for operating the core 20. These two pulses should be nearly the same shape and occur at nearly the same time preferably with the voltage pulse lagging very slightly. Various means as hereinafter more fully explained may be used for providing such pulses. For purposes of simplification, such means are shown, in Fig. 2, as separate pulse generators 23 and 25.

In operation then, as soon as the input current pulse arrives, it flows through winding 22, such winding being arranged so that the flow of input pulse current through it will tend to saturate the flux of core 20 in the positive direction as shown in Fig. 1. Assuming the core 20 originally was at position 8, this current will change the flux of the core from position 8 to position 12. This change of flux induces a large voltage across all of the windings on the core 20, thus sensing the polarity of the residual magnetic flux of the core.

The input voltage pulse—the signal voltage—as supplied by voltage pulse generator 25 is, in effect, in series with winding 24 and grid 32 of triode 30. Such winding 24 is arranged on core 20 to provide a magnetizing effect opposite to that of winding 22 so that the voltage induced across winding 24 by the input current pulse from pulse generator 23 is in the opposite direction to the input voltage pulse and in effect cancels it. In this state of core saturation then, the grid 32 of triode 30 does not reach a high enough voltage to cause flow of plate current. Thus, after both the input current pulse and input voltage pulse have terminated, the core 20 will be in position 6 with no current flow through any of the windings.

Upon the arrival of the next following simultaneous current and voltage pulses, the current pulse flowing through winding 22 will change the flux of the core from position 6 to position 10. Under these conditions there will be negligible flux change in the core 20 and very small or negligible voltages will be induced across any of the windings. The arrival of the input voltage pulse will thus be unopposed by the voltage induced across winding 24 and will send the voltage of grid 32 of triode 30 to a sufficiently high value to cause flow of plate current through triode 30 as well as through coil 40 and winding 26. The winding 26 is arranged on core 20 so that current flow through it caused by plate current flow through triode 30 has a magnetizing effect opposite to that of the current pulse flowing through winding 22. The plate current flow through winding 26 thus cancels and reverses the effect of the current pulse flowing through winding 22.

Under these conditions, the flux of core 20, instead of going from the position 6 to 10, will start back toward 12 as shown by the arrows on the hysteresis curve of Fig. 1. As soon as the flux changes from 6 to 12, it will induce voltages across all the windings of the core with the voltage polarity reversed compared to the voltage polarity induced when the flux changes from 8 to 10. This voltage change across winding 24 acts as a positive feedback means and aids the input voltage pulse in driving the grid 32 of triode 30 in a positive direction to further increase the plate current flow and further speed up the flux change from position 6 to 12. The flux change, the induced voltage, and the amplification of the tube 30 provide the trigger action of the scaler until the flux of core 20 reaches its negative saturation 12. As soon as the flux reaches 12, no more voltage will be induced across the windings on core 20, and the triggering action will cease. Thus, the flux of the core will remain at 8 until the next pulse comes. The flux of the core will make one complete cycle for each two input simultaneous current and voltage pulses to provide a single output pulse across output coil 40.

Since the triode vacuum tube 30 acts only as an amplifying means and as part of the positive feedback means for core 20, it operates only when it produces an output pulse. Thus, it draws plate current for but a small portion of its operating time. This effects a great saving in the required high voltage power over the usual trigger pair in which one of the tubes always drew plate current. My novel scaler, then, provides a much better counter for battery operated service, particularly when transistors are used to eliminate the filament current drawn by a vacuum tube.

Figure 3:
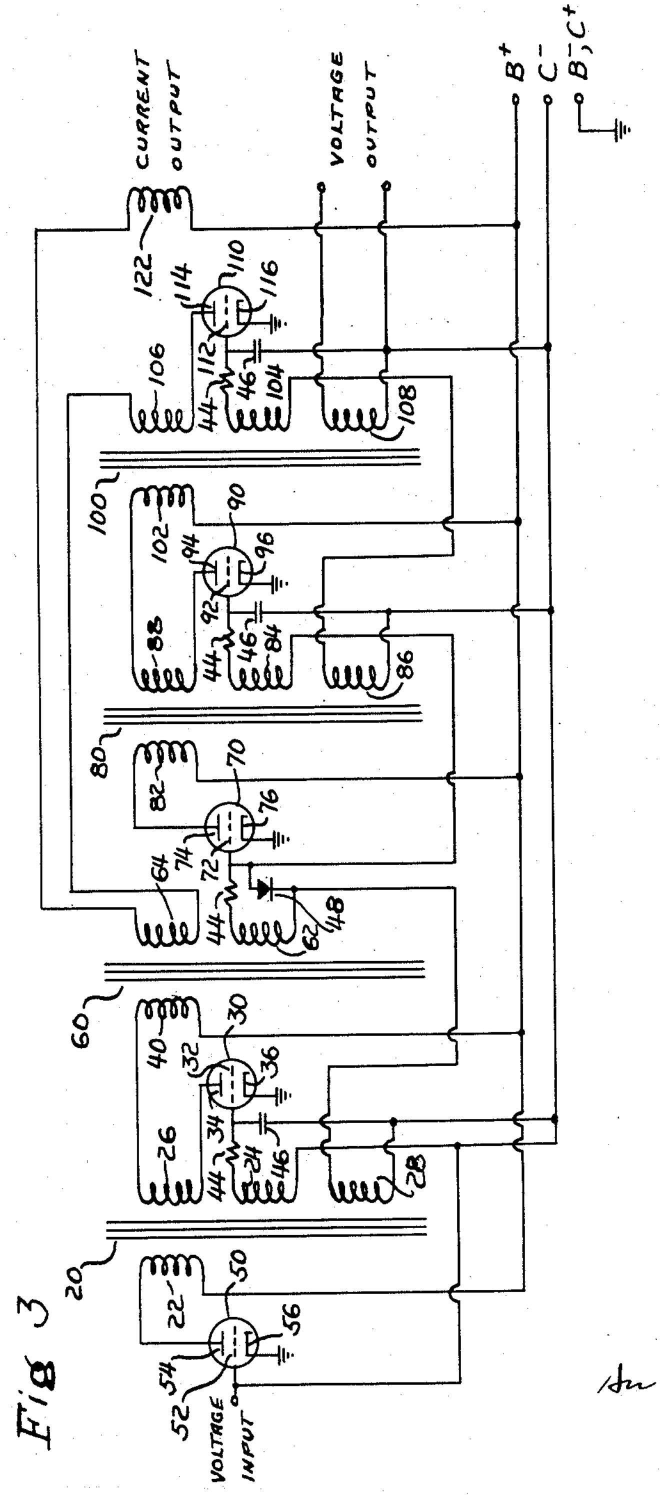
Fig. 3 is a circuit diagram of the decade scaler of my invention.

Referring now to Fig. 3, my novel decade scaler in effect includes a scale-of-five scaler in addition to a binary scaler substantially as described above, although it also includes some circuit modifications which improve its operation over that of the simple binary scaler.

For example, I have shown a scaler input means for providing substantially simultaneous current and voltage input pulses to first core 20, the binary scaler portion of the decade scaler, such input circuit including a triode vacuum tube 50. If a properly biased input voltage pulse is fed to the grid 52 of triode 50, plate current will flow through said triode between its plate 54 and its cathode 56 and through current pulse input winding 22 on core 20, one end of said input current pulse winding 22 being connected to triode plate 54 and the other end of said winding 22 being connected to a suitable source of B+ voltage. Since a voltage input pulse may be used directly to operate voltage input winding 24 on core 20, such voltage pulse may be provided by connecting one end of said winding 24 to grid 52 of triode 50. Thus the arrival of an input voltage pulse at grid 52 will provide suitable simultaneous current and voltage pulses to core 20 of the binary scaler and said scaler will provide a single output pulse for two voltage input pulses arriving at the grid 52 of triode 50. In order to provide simultaneous current pulses and voltage pulses from the output of binary scaler core 20, the coil 40 of Fig. 2 is used as a winding on the next succeeding core, the voltage output pulse for which is provided by winding 28 on core 20. Winding 28 is connected at one end to a suitable source of negative grid bias and at its other end to the voltage input winding on the next succeeding core.

I also prefer that each triode have a time delay circuit included in its grid circuit, such time delay circuit including a resistor 44 in series with each grid and the voltage input winding and a capacitor 46 connected at each grid across the voltage input to said grid. The time delay circuit delays the arrival of the input voltage pulse at each triode to allow sufficient time for a voltage to be induced across winding 24 by the flow of current in winding 22, which slightly improves the reliability of my novel scaler circuit, if the voltages are simultaneous rather than with a lagging voltage pulse.

The scale-of-five portion of my novel decade scaler includes three cores 60, 80 and 100 having triodes 70, 90 and 110 cooperating with said cores respectively. The first core 60 of said scale-of-five scaler has a current input winding 40 connected to the binary portion of the scaler as hereinbefore described. A voltage input winding 62 on said core 60 is connected at one end to voltage output winding 28 on core 20 and at the other end through resistor 44 to grid 72 of triode 70, said voltage input winding 62 having a unilateral current device 48 such as a selenium rectifier, in parallel therewith to prevent operation of triode 70 by signals of other than voltage input signals from winding 24 or core 20 as hereinafter more fully explained. Core 60 is also provided with a feedback winding 64 as hereinafter more fully explained.

The second core 80 of the scale-of-five portion of the decade counter has a current input winding 82 connected between the plate 74 of triode 70 and a suitable source of B+ voltage. A voltage input winding 84 is also provided on said core 80 connected between the grid 72 of triode 70 and the grid 92 of triode 90 through resistor 44 between said winding 84 and said grid 92. Said core also has a voltage output winding 86 and a reset winding 88, the latter winding being in the plate circuit of triode 90.

The third core 100 of said scale-of-five scaler includes a current input winding 102 connected at one end to a suitable source of B+ voltage and at its other end through reset winding 88 to plate 94 of triode 90. The voltage input winding 104 on said core is connected between voltage output winding 86 on core 80 and grid 112 of triode 110 through time delay resistor 44. Suitable grid bias is supplied to said grid by connecting an end of said winding 86 to a source of grid bias. A reset winding 106 on core 100 is connected at one end to plate 114 of triode 110 and at the other end to winding 64 on core 60, the first core of the scale-of-five scaler. B+ voltage is supplied to said triode 110 through said winding 64 and a current output coil 122 which may be as a winding on the next succeeding core if further scaling is desired. Voltage output from core 100 may be provided by a winding 108 on said core.

In a preferred embodiment of the decade scaler as above described, I employ 12 AT7 twin triode tubes as the triodes 30, 50, 70, 90 and 110. Using such tubes, with a voltage input pulse of from 4 to 7 microseconds 15 volt positive and a current input pulse of from 4 to 7 microseconds 20 milliamperes provided at core 20 (the latter being provided by triode 50), and with each tube provided with a B+ voltage of 250 volts and a negative grid bias (C−) of 10 volts, and with the B−, C+ and the cathodes 36, 56, 76, 96 and 116 of triodes 30, 50, 70, 90 and 110 respectively grounded, I am able to provide a scaling ratio of 10 at a maximum operating frequency of 110 kilocycles per second. Under such conditions my scaler provides a voltage pulse output of 5 microseconds 15 volts positive and a current pulse output of 5 microseconds 20 milliamperes, and such outputs can be used directly for driving the next succeeding decade scaler if one is to be used.

In operation then, a series of input pulses fed to the grid of input triode 50 will be divided by two in the binary scaler portion of my decade scaler including core 20 and triode 30 and applied to core 60. For example assume that cores 60, 80 and 100 are all started in the negative saturation state, as follows:

| Core | Core | Core |
|---|---|---|
| 60<br>− | 80<br>− | 100<br>− |

When the 1st pulse comes from the binary scaler portion to core 60 (current flowing in winding 40 and positive voltage from winding 28) the current input changes core 60 to positive saturation. This flux change induces voltage across winding 62 which opposes the positive voltage from winding 28. The grid 72 thus remains cut-off, and triode 70 does not become conducting. The cores then assume the following saturation states:

| Core | Core | Core |
|---|---|---|
| 60<br>+ | 80<br>− | 100<br>− |

When the 2nd pulse comes, core 60 is already saturated, so that zero or a very small voltage is induced across winding 62. The positive voltage from winding 28 thus makes grid 72 positive, triode 70 becomes conducting and plate current flows through winding 82 to plate 74. This current in winding 82 changes flux of core 80 to positive saturation, and the flux change of core 80 induces a voltage across winding 84 which opposes the positive voltage from grid 72. Grid 92 thus remains cut-off and triode 90 does not become conducting. The cores then assume the following saturation states:

| Core | Core | Core |
|---|---|---|
| 60<br>+ | 80<br>+ | 100<br>− |

When the 3rd pulse comes, core 60 is still saturated, so that grid 72 is positive, triode 70 conducts, and current flows to winding 82. Since core 80 is already saturated, however, very little voltage is induced across winding 84, and grid 92 becomes positive. Triode 90 then conducts, and current flows through windings 88 and 102. The current flow in winding 88 cancels the effect of current in winding 82 and reverses the flux in core 80 to negative saturation. This action is aided by the voltage induced across winding 84 to keep grid 92 positive until the flux of core 80 reaches negative saturation. This same current flowing through winding 102 changes the flux of core 100 from negative to positive saturation. Positive voltage is induced across winding 86 by the flux change of core 80 but is opposed by the voltage across winding 104. Grid 112 of triode 110 thus remains cut-off. The cores then assume the following saturation states:

| Core | Core | Core |
|---|---|---|
| 60<br>+ | 80<br>− | 100<br>+ |

When the 4th pulse comes, core 60 is still saturated at positive saturation, grid 72 is then positive, and tube 70 conducts. Current flows through winding 82 to change flux of core 80 to positive saturation. Grid 92 remains cut-off because the voltage induced across winding 84 opposes the positive voltage of grid 72. The cores then assume the following states:

| Core | Core | Core |
|---|---|---|
| 60<br>+ | 80<br>+ | 100<br>+ |

When the 5th pulse comes, core 60 is still saturated at positive saturation. Grid 72 thus becomes positive and triode 70 conducts. Core 80 already is saturated in the positive state. Grid 92 thus becomes positive, and triode 90 conducts and sends current flow through windings 88 and 102. The current in winding 88 cancels the effect of current in winding 82 and reverses the flux of core 80 from positive to negative, aided by the voltage across winding 84 as explained above. The same current in winding 102 tends to saturate the core 100 to positive saturation, but since core 102 is already in the positive direction, very little voltage will be induced across winding 104 to oppose the voltage across winding 86, so that grid 112 becomes positive and triode tube 110 conducts. Current thus flows through windings 106, 64 and 122. The current in winding 106 cancels the effect of the current in winding 102 and reverses flux of core 100 from positive to negative saturation. When the flux of core 100 changes from positive to negative, the voltage induced across winding 104 helps to keep grid 112 positive until the core 100 completely saturates to negative saturation. The same current flow through winding 64 cancels the effect of the current input in winding 40 and changes the flux of core 60 from positive saturation to negative saturation. While core 60 is changing its flux, voltage across its winding 62 will tend to make grid 72 positive, but this voltage is prevented from reaching grid 72 by the unilateral current device 48.

After the 5th pulse the cores will assume the following states:

| Core | Core | Core |
|---|---|---|
| 60 | 80 | 100 |
| − | − | − |

This is the same condition that existed before the first pulse arrived. Thus the cores make a complete cycle for every five pulses and the scaler will provide a single output pulse for each five input pulses and then reset itself. Such scaler may be combined with the binary scaler as above described to provide a surprisingly simple decade scaler circuit.

My novel scaler circuits using a current pulse to sense the residual count in a magnetic core and the induced voltage to control the stepping of the counter may be adapted to provide a scaler of any desired ratio. For example, in Fig. 4 I have shown a four stage scaler having switches which may be used to set the scaler to any one of a number of scaling ratios.

Figure 4:
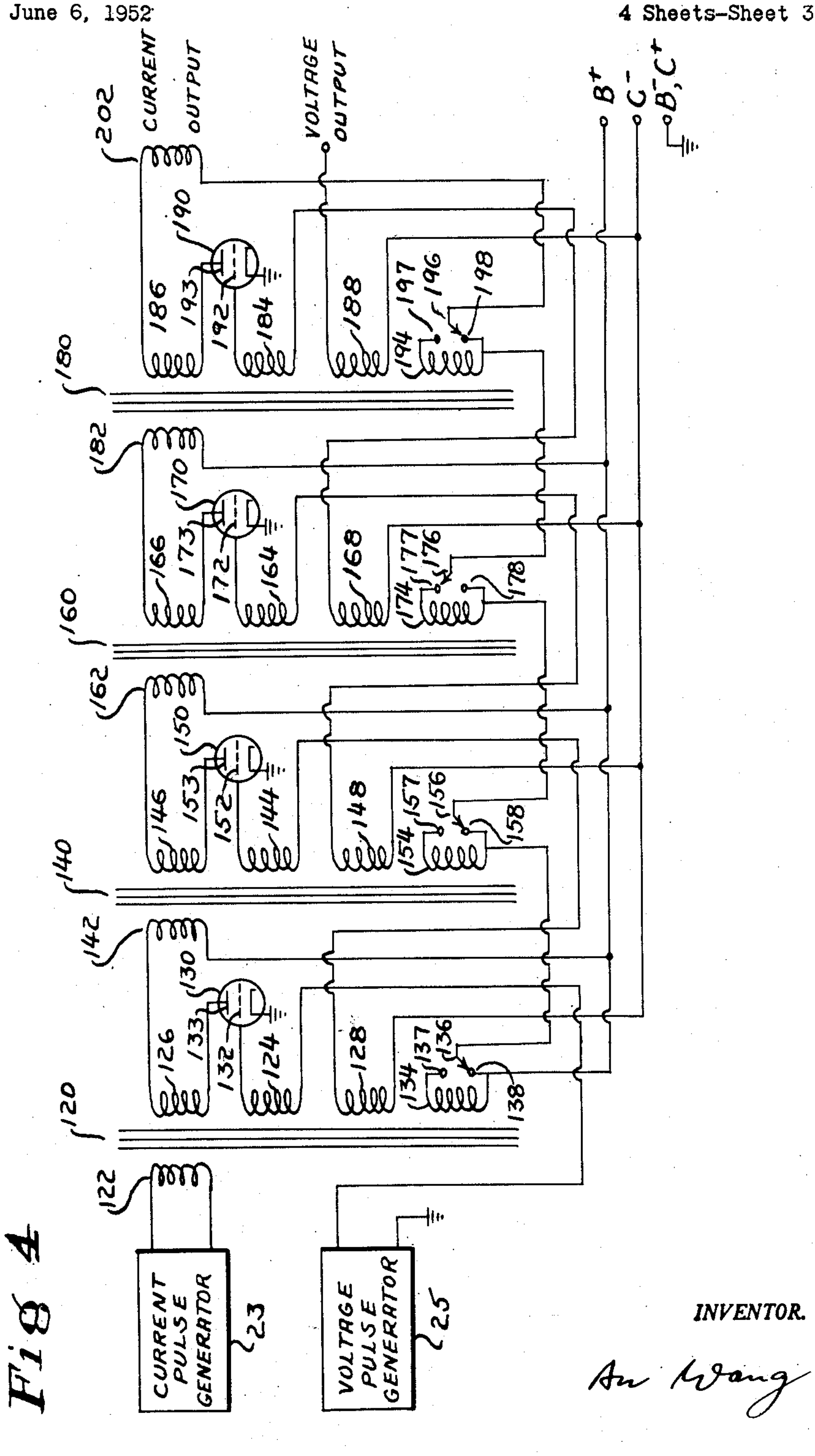
Fig. 4 is a circuit diagram of a scaler of my invention which may be set to any one of a number of ratios.

The setting scaler of Fig. 4 includes a series of four cores each of which is similar to that of the binary scaler of Fig. 2, but having an extra feedback winding. The first core 120 has, then, five windings, a current input winding 122, voltage input and output windings 124 and 128 respectively, a reset winding 126 and a feedback winding 134, such feedback winding being provided with a single pole single throw shorting switch 136 having terminals 137 and 138. The voltage input winding 124 and the reset winding 126 are connected to the grid 132 and plate 133 respectively of triode 130. Suitable voltage and current pulses are supplied to said first core 120 by current pulse generator 23 and voltage pulse geneartor 25 as more fully described above.

The second core 140 has a current input winding 142 connected to reset winding 126, and a voltage input winding 144 connected to voltage output winding 128 on core 120, as well as a voltage output winding 148 and a reset winding 146. The voltage input winding 144 and the reset winding 146 are connected to the grid 152 and plate 153 respectively of triode 150. A feedback winding 154 on said core 140 is provided with a shorting switch 156 having terminals 157 and 158.

The third core 160 has a current input winding 162 connected to reset winding 146 and a voltage input winding 164 connected to voltage output winding 148 on core 140, as well as a voltage output winding 168 and a reset winding 166. The voltage input winding 164 and the reset winding 166 are connected to the grid 172 and plate 173 respectively of triode 170. A feedback winding 174 on said core 160 is provided with a shorting switch 176 having terminals 177 and 178.

The fourth core 180 has a current input winding 182 connected to reset winding 166 and a voltage input winding 184 connected to voltage output winding 168 on core 160, as well as a voltage output winding 188 and a reset winding 186. The voltage input winding 184 and the reset winding 186 are connected to the grid 192 and plate 193 respectively of triode 190. A feedback winding 194 on said core 100 is provided with a shorting switch 196 having terminals 197 and 198.

In order to provide current pulse output from the scaler, a current output winding 202 is provided in series with reset winding 186 on the fourth core 180, said winding 202 being connected to a source of B+ through the four shorting switches in series, so that the current pulse through winding 202 and triode 190 may be fed back to any one of feedback windings 134, 154, 174, or 194 by operating their respective switches 136, 156, 176 or 196 to either allow pulse current to pass through the feedback winding or to short out the winding.

Thus, the feedback may be selectively applied to a preceding coil. For example, if all the switches 136, 156, 176, and 196 are in position to short out their respective feedback windings 134, 154, 174, and 194, the feedback windings will have no effect. Thus, if one starts with all the cores in the state of negative saturation, it will take 24 or 16 pulses to make a whole cycle and return all the cores to negative saturation again. The successive changes of core saturation can be written as follows:

| | | | | |
|---|---|---|---|---|
| starting position | − | − | − | − |
| after 1st pulse | + | − | − | − |
| 2nd | − | + | − | − |
| 3rd | + | + | − | − |
| 4th | − | − | + | − |
| 5th | + | − | + | − |
| 6th | − | + | + | − |
| 7th | + | + | + | − |
| 8th | − | − | − | + |
| 9th | + | − | − | + |
| 10 | − | + | − | + |
| 11 | + | + | − | + |
| 12 | − | − | + | + |
| 13 | + | − | + | + |
| 14 | − | + | + | + |
| 15 | + | + | + | + |
| 16 | − | − | − | − |

When the 16th pulse is provided by pulse generators 23 and 25, triode 190 conducts. A feedback path can be set up by the shorting switches to set one of a number of different scaling ratios. As shown in Fig. 4, triode 190 will send a current through feedback winding 174 on the third core 160. This current will make the core 160 saturate to the + direction at the end of the 16th pulse. The cores will then assume the following saturation state condition after the 16th pulse

− − + −

The scaler will thus scale 12 instead of 16. By suitable setting of the shorting switches 136, 156, 176 and 196, the scaler can be set to any scaling ratio from 1 to 16. Such an arrangement can be used with any number of stages instead of the four shown herein, also, although I prefer to use separate feedback windings it is possible to use any one of the existing windings for the same purpose.

Since my novel setting scaler uses only half as many triodes as with the heretofore known trigger circuits, and since such triodes operate only for the time they are generating a pulse, my novel scaler is not only capable of being made physically smaller than heretofore known scalers but also requires much less operating power, the latter being particularly valuable with self powered scalers.

Figure 5:
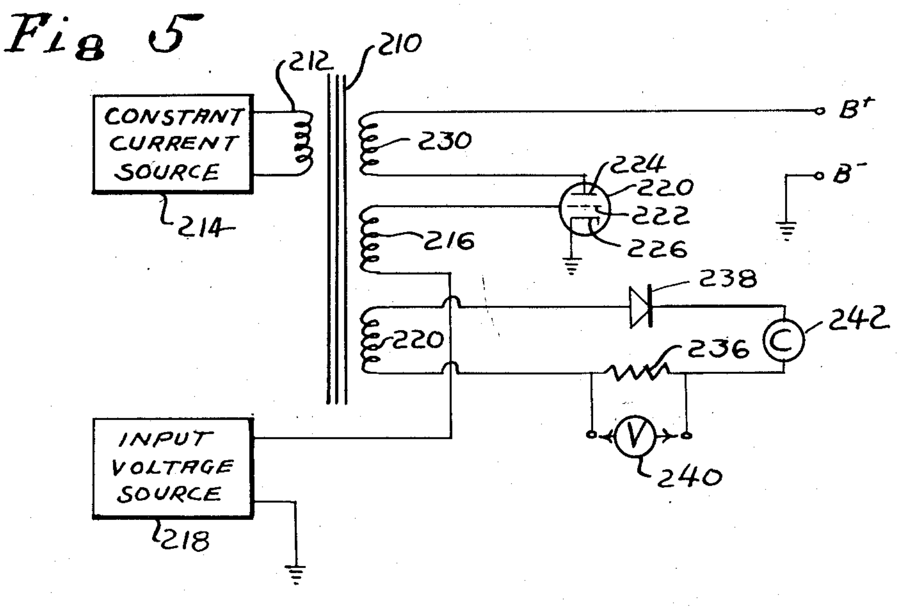
Fig. 5 is a circuit diagram of a novel triggering circuit of my invention.

Still another embodiment of my invention particularly useful as a triggering circuit is shown in Fig. 5. This circuit includes a magnetic core 210 with winding means consisting of one or more windings thereon and an amplifying and controlling means such as vacuum tube 220. Other suitable amplifying means such as transistors or magnetic amplifiers for example, could be used.

The core 210 is provided with four windings, a constant current winding 212, input voltage winding 216, a reset winding 230, and a voltage output winding 220. The input current winding 212 is connected to any suitable source 214 of constant current. The input voltage winding is connected at one end thereof to a source 218 of input voltage as hereinafter more fully explained, and at the other end to the grid 222 of triode 220. The reset winding 230 is connected at one end to a suitable source of B+ voltage and at the other end to plate 224 of triode 220. The cathode 226 of said triode is connected to the B− side of the high voltage supply for said triode, both the cathode and the B— being shown as grounded in Fig. 5.

Figure 6:
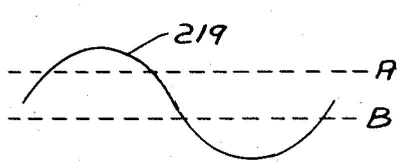
Figs. 6 and 7 are waveform diagrams of the triggering circuit of Fig. 5.

In operation then the constant current supply tends to saturate the core 210 in the negative direction. The input voltage as shown in Fig. 6 is varied such that at some time the grid voltage becomes high enough so that plate current flows in triode 220, such high grid voltage being indicated at level A on Fig. 6. When plate current flows, the magnetizing effect of the current through reset winding 230 exceeds that of the current flowing through winding 216, and the magnetic flux of core 210 will begin to change from negative to positive. This change of flux induces voltage across winding 216 thereby further increasing the grid voltage of triode 220. This increases the flow of current through reset winding 230 to further increase the rate of flux change and the voltage across 216 to provide positive feedback, producing a rapid increase of the flow of current through reset winding 230, a rapid change of a flux of core 210 from negative to positive, and a very large pulse voltage across output winding 220. The flux change ceases when the flux in the core reaches positive saturation. The flux will remain at saturation no matter how large the grid input of voltage increases. Due to the hysteretic nature of the core, any variation of the input voltage will not change the magnetic flux by any appreciable amount. The core 210 thus remains at positive saturation until the varying input voltage drops to a new level—level B in Fig. 6—which is lower than level A. At the level B the current through winding 230 is so small that the effect of the current through winding 216 exceeds that of the current through winding 230 and the flux of core 210 thus starts to change back from positive to negative saturation. This induces negative voltage across winding 216 which further reduces the current through winding 230 which action continues until the flux of core 210 has changed back to negative saturation.

Figure 7:
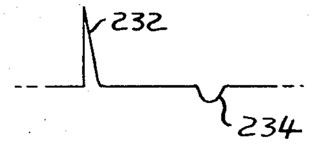

Such action of my novel trigger circuit produces a large sharp pulse when a slowly varying input voltage 219 reaches a certain level and produces a pulse of opposite polarity when the input voltage 219 lowers to another level, such pulses being diagrammatically shown in Fig. 7.

The number of voltage pulses of a single polarity may be detected by measuring the voltage across a resistor 236 in series with a rectifier 238 and voltage output winding 220, such being possible since the output pulses from a magnetic core having the characteristics as hereinbefore set forth is produced by a definite amount of the flux change from one saturation value to another. The area under the pulse in the time scale will be a constant, and hence the sum of the average voltages of such pulses is directly proportional to the number of such pulses. Such arrangement then provides an exceedingly simple means for counting such pulses, as the indicating voltage which appears across resistor 236 may be measured by any suitable average voltmeter such as a vacuum tube voltmeter 240. Similarly a D. C. current meter 242 may be used in series connection with the rectifier or other unilateral current device 238. The D. C. meter 242 will measure the average current flow, and, as such average current will be determined by the pulse rate, it will thus measure such pulse rate.

Various modifications of my novel circuits other than those herein shown and described but within the spirit of my invention and the scope of the appended claims will occur to those skilled in the art.

I claim:

1. A scaler including a pulse transfer controlling device comprising a core of magnetic material in which the residual magnetic flux density is a large fraction of the saturation flux density, winding means on said core, current pulse means connected to said winding means arranged to sense the polarity of the residual magnetic flux of said core to provide a core output voltage, signal voltage means connected to said winding means, and mixer means connected and arranged to mix said core output voltage with said signal voltage to provide a single combined output pulse, said current pulse means and said signal voltage means being connected and arranged to provide substantially simultaneous current and voltage pulses.

2. A scaler as claimed in claim 1 wherein said core has a substantially rectangular hysteresis loop with substantially square knees and in which the residual magnetic flux density is at least 0.8 of the saturation flux density.

3. A scaler including a pulse transfer controlling device comprising a core of magnetic material in which the residual magnetic flux density is a large fraction of the saturation flux density, a first winding means on said core, current pulse means connected to said first winding means, amplifying means having an anode and a grid, an anode voltage source, a second winding means on said core connected to said grid, and signal pulse means connected to said second winding means opposing said current pulse means, said current pulse means and said signal pulse means being connected and arranged to provide substantially simultaneous pulses.

4. A scaler including a pulse transfer controlling device comprising a core of magnetic material in which the residual magnetic flux density is a large fraction of the saturation flux density, winding means on said core, current pulse means connected and arranged to sense the polarity of the residual magnetic flux of said core to provide a core output voltage, signal voltage means connected to said winding means mixer means connected and arranged to mix said core output voltage with said signal voltage to provide a single combined output pulse, and amplifying means connected and arranged to amplify said combined output voltage, said current pulse means and said signal voltage means being connected and arranged to provide substantially simultaneous current and voltge pulses.

5. A scaler as claimed in claim 4 further having time delay means connected in the input circuit of said amplifying means.

6. A scaler including a pulse transfer controlling device comprising a core of magnetic material in which the residual magnetic flux density is a large fraction of the saturation flux density, a first winding means on said core, current pulse means connected to said first winding means, amplifying means having an anode and a grid, an anode voltage source, a second winding means on said core connected to said grid, and signal pulse means connected to said second winding means opposing said current pulse means.

7. A scaler as claimed in claim 6 further having a third winding means on said core connected to said anode and said anode voltage source aiding said signal pulse to provide positive feedback to aid saturation of said core.

8. A scaler including a plurality of pulse transfer controlling devices each comprising a core of magnetic material having a substantially rectangular hysteresis loop in which the residual magnetic flux density is a large fraction of the saturation flux density, a plurality of windings on said cores, amplifying means for said cores, and feedback means arranged and connected between a succeeding and a preceding core.

9. A scaler as claimed in claim 8 in which said feedback means may be selectively applied to a preceding core.

10. A scaler including a plurality of pulse transfer controlling devices each comprising a core of magnetic material in which the residual magnetic flux density is a large fraction of the saturation flux density, a plurality of windings on said cores, amplifying means for said cores, and feedback means arranged and connected between a succeeding and a preceding core, for selective application to a preceding core.

11. A decade scaler including four pulse transfer controlling devices each comprising a core of magnetic material having a substantially rectangular hysteresis loop in which the residual magnetic flux density is a large fraction of the saturation flux density, a plurality of windings on said cores, pulse generator means connected to windings on the first of said cores, amplifying means for each of said cores, said amplifying means interconnecting said windings on adjacent cores to provide a current pulse for the next succeeding core, and feedback means connected between a winding on a fourth of said cores and a winding on the second of said cores.

12. A scaler comprising a pulse transfer controlling device including a core of magnetic material in which the residual magnetic flux density is a large fraction of the saturation flux density, winding means on said core, current pulse means connected to said winding means providing input current pulses for setting said core in a first state of residual magnetic flux density, voltage pulse means connected to said winding means providing an output voltage pulse when a current pulse maintains said core in said first state of residual magnetic flux density, said current pulse means, when setting said core from a second state of residual magnetic flux density to said first state of residual magnetic flux density, providing a pulse effective to cancel an output voltage pulse, and amplifying means having an input and an output connected to said winding means providing resetting pulses for resetting said core from said first state of residual magnetic flux density to said second state of residual magnetic flux density, said input being connected to said voltage pulse means through said winding means and being energized by an output voltage pulse to initiate output current flow to provide a resetting pulse, whereby the flux of said core makes a complete cycle for each two current pulses to provide a single output pulse.

13. A scaler comprising a pulse transfer controlling device including a core of magnetic material in which the residual magnetic flux density is a large fraction of the saturation flux density, first, second and third windings on said core, current pulse means connected to said first winding providing input current pulses for setting said core in a first state of residual magnetic flux density, voltage pulse means connected to said second winding providing an output voltage pulse when a current pulse maintains said core in said first state of residual magnetic flux density, said current pulse means, when setting said core from a second state of residual magnetic flux density to said first state of residual magnetic flux density, providing a pulse effective to cancel an output voltage pulse, and amplifying means having a grid and an anode connected to said second winding and third winding respectively providing resetting pulses for resetting said core from said first state of residual magnetic flux density to said second state of residual magnetic flux density, said grid being connected to said voltage pulse means through said second winding and being energized by an output voltage pulse to initiate anode current flow to provide a resetting pulse to said core through said third winding, whereby the flux of said core makes a complete cycle for each two current pulses to provide a single output pulse.

14. A scaler including a plurality of pulse transfer controlling devices each comprising a core of magnetic material in which the residual magnetic flux density is a large fraction of the saturation flux density, winding means on said cores, current pulse means connected to said winding means on a first one of said cores providing input current pulses for setting said core in a first state of residual magnetic flux density, voltage pulse means connected to said winding means on said first core providing an output voltage pulse when a current pulse maintains said core in a first state of residual magnetic flux density, said current pulse means, when setting said first core from a second state of residual magnetic flux density to said first state of residual magnetic flux density providing a pulse effective to cancel an output voltage pulse, and amplifying means having an input and an output interconnecting said winding means on said cores providing resetting pulses for resetting said first core from said first state of residual magnetic flux density to said second state of residual magnetic flux density and for setting a succeeding core in a first state of residual magnetic flux density, said input being connected to said voltage pulse means throughout said winding means on said first core and said output being connected to said winding means on both said first and second cores, said amplifying means being energized by an output voltage pulse to initiate output current flow to provide a resetting pulse for said first core and a setting pulse for said second core.

15. A scaler including a plurality of pulse transfer controlling devices each comprising a core of magnetic material having a substantially rectangular hysteresis loop in which the residual magnetic flux density is a large fraction of the saturation flux density, winding means on said cores, voltage pulse means, amplifying means having an input and an output interconnecting said winding means on preceding and succeeding cores, the input of said amplifying means being connected to said winding means on a preceding core and to said voltage pulse means and the output of said amplifying means being connected to said winding means on both said preceding and succeeding cores to set said succeeding core and reset said preceding core.

16. A scaler including a plurality of pulse transfer controlling devices each comprising a core of magnetic material having a substantially rectangular hysteresis loop in which the residual magnetic flux density is a large fraction of the saturation flux density, winding means on said cores, voltage pulse means, a plurality of amplifying means interconnecting said winding means on preceding and succeeding cores, the input of said amplifying means being connected to said winding means on a preceding core and to said voltage pulse means and the output of said amplifying means being connected to said winding means on both said preceding and succeeding cores to set said succeeding core in a first state of residual magnetic flux density and to reset said preceding core in a second state of residual magnetic flux density.

17. A scaler as claimed in claim 16 wherein said core has a residual magnetic flux density of at least 0.8 of the saturation flux density.

18. A scaler including a plurality of pulse transfer controlling devices each comprising a core of magnetic material in which the residual magnetic flux density is a large fraction of the saturation flux density, first, second and third windings on each of said cores, voltage pulse means, a plurality of amplifying means having a grid and an anode, said grid being connected to said second winding on a preceding core and to said voltage pulse means and said anode being connected to said third winding on said preceding core and to said first winding on a succeeding core to set said succeeding core in a first state of residual magnetic flux density and to reset said preceding core in a second state of residual magnetic flux density.

19. A scaler as claimed in claim 18 having a fourth winding on each of said cores, said fourth winding being connected to said second winding on a succeeding core.

20. Triggering means including a pulse transfer controlling device comprising a core of magnetic material having a substantially rectangular hysteresis loop in which the residual magnetic flux density is a large fraction of the saturation flux density, winding means on said core, current pulse means connected to said winding means to provide output pulses controlled by the variations of a varying signal, and detecting means for detecting said output pulses, said detecting means including means adapted to determine the rate of said output pulses.

21. Triggering means as claimed in claim 20 wherein said core has a residual magnetic flux density of at least 0.8 of the saturation flux density.

22. Triggering means as claimed in claim 20 wherein said detecting means includes unilateral current means and means for measuring the average current of said output pulses.

23. Triggering means including a pulse transfer controlling device comprising a core of magnetic material having a substantially rectangular hysteresis loop in which the residual magnetic flux density is a large fraction of the saturation flux density, winding means on said core, current pulse means connected to said winding means to provide output pulses controlled by the variations of a varying signal, and detecting means for detecting said output pulses, said detecting means including meter means adapted to determine the rate of said output pulses.

24. Triggering means including a pulse transfer controlling device comprising a core of magnetic material having a substantially rectangular hysteresis loop in which the residual magnetic flux density is a large fraction of the saturation flux density, winding means on said core, constant current means connected to said winding means, varying signal voltage means connected to said winding means, amplifying means connected to said winding means to provide output voltage pulses controlled by the variations of said varying signal voltage, and detecting means including rectifier means in series with said winding means and current meter means adapted to determne the rate of said output voltage pulses.

25. Triggering means including a pulse transfer controlling device comprising a core of magnetic material in which the residual magnetic flux density is a large fraction of the saturation flux density, winding means on said core, current pulse means connected to said winding means, varying signal means connected to said winding means to provide output pulses controlled by the variations of a varying signal, and indicating means for said output pulses.

26. Triggering means as claimed in claim 25 wherein said core has a residual magnetic flux density of at least 0.8 of the saturation flux density.

27. Triggering means as claimed in claim 25 wherein said indicating means indicates the rate of said output pulses.

28. Triggering means as claimed in claim 25 wherein said indicating means counts said output pulses.

References Cited in the file of this patent

UNITED STATES PATENTS

| | | |
|---|---|---|
| 1,438,988 | Espenschied et al. | Dec. 19, 1922 |
| 2,591,406 | Carter et al. | Apr. 1, 1952 |
| 2,652,501 | Wilson | Sept. 15, 1953 |
| 2,708,722 | Wang | May 17, 1955 |

OTHER REFERENCES

"Magnetic Triggers" by An Wang, pages 626–629, Proc. of the IRE for June 1950.

"Magnetic Delay Line Storage" by An Wang, pages 401–407, Proc. of the IRE for April 1951.